United States Patent Office 3,393,119
Patented July 16, 1968

3,393,119
METHOD OF MAKING A HEAT SEALED FOAM LAMINATE AND PRODUCT THEREFROM
Hugh C. Dugan, 268 High St., Nutley, N.J. 07110
No Drawing. Filed Apr. 20, 1964, Ser. No. 361,286
13 Claims. (Cl. 161—160)

ABSTRACT OF THE DISCLOSURE

A laminate and method for the production thereof, the laminate being comprised of a top element of a fabric supported with a thermoplastic compound, a resinated non-woven fabric, a non-thermoplastic expanded polymer, such as polyurethane foam, the interstices of which contain a thermoplastic resin having a softening point lower than the softening point of the polymer, such as a vinyl chloride resin, and a bottom element of a fabric supported with a thermoplastic compound, the laminate being held together by a heat seal. The thermoplastic resin is applied to the surface of the expanded polymer which is then heat treated, prior to producing the laminate, to produce the expanded polymer having the resin in the interstices thereof. The use of the treated expanded polymer results in laminates having increased strength which are particularly suited for the production of upholstery.

This invention relates to expanded cellular material, and their uses in laminated materials, as well as a method of making such laminated material. More particular, the invention relates to a method of treating an expanded cellular material to permit the use thereof as laminated padding materials, and to novel laminated upholstery materials formed with such laminated padding materials.

The laminated padding materials contemplated by this invention are particularly adapted for use as covering materials for vehicle and boat seats and back structures. As will become readily apparent, the product of this invention has many diverse uses, such as, furniture cushioning, automobile trim components and the like, however, to facilitate an understanding of the invention, the invention will be described with reference to the formation of a laminated upholstery material suitable for use as vehicle seats and back structures.

In the finishing of vehicles, it is customary to construct the vehicle seat and back structure by securing padding over the spring structure and then to secure a fabric material over the padding, as by sewing and stapling. More recently, latex foam rubbers have been used with a gradual trend towards the use of thermoplastic foams. Difficulties with latex foams resided in the inability to satisfactorily attach the fabric material to the foam so as to form a product which was substantially resistant to distortion after being subjected to nominal wear. This condition is attributable to insufficient body and structural resilience and rigidity in the finish fabrics.

It has become common to impart an embossed or quilted effect to the surface of seats, scuff and trim panels, and the like. On vehicle seats this had led to the use of a material having what is sometimes referred to as a "stuffed-pleat" construction. Such material is made by placing a layer of a padding material between a backing sheet and an upper sheet of an upholstery finish fabric, leather, plastic, and the like and sewing a pattern through all three layers. In others, buttons, decorative fasteners, etc. are secured in a decorative pattern through all three layers. Up to the present this type of quilted or stuffed-pleat upholstery has been expensive due to the number of hand operations involved in its manufacture and it has been difficult to obtain a uniformly well-filled material due to the inherent non-uniformity of most padding materials and the difficulty in anchoring them in place. When working with plastic materials thread stitching, button-type fasteners, etc. have a tendency to tear out of the plastic and ruin the appearance and utility of the material.

Still more recently, industry has turned towards the use of thermoplastic foams for inclusion in such laminated upholstery materials. Such foams are easily welded between fabric or fibrous mats, bats, webs, felted forms or other textile forms of fibrous materials, such as cotton, wool, jute, acetate, rayons, polyesters and the like, where such fibrous materials are reinforced with a thermoplastic compound, such as polyvinyl chloride and co-polymers thereof, and the like. Such foams are readily heat sealed to the base and finish fabrics, as for instance, as shown in U.S. Patent 2,354,714, Strickland.

One of the problems encountered by the use of an expanded polyvinyl chloride foam results from the non-uniform cell structure thereof, as well as the fact that such foams are not readily prepared in continuous rolls but rather as sheets, since such foams are prepared under pressure. Additionally, such foams do not exhibit the same qualities of stiffness and rigidity, or the ability to more readily distribute a force through a greater volume of the foam as demonstrated by the urethane foams.

Recently, it was suggested to treat a non-thermosetting foam with a thermoplastic resin contained in the form of a dispersion or plastisol. The foam was preferably pretreated to break down the cell structure so as to provide for better uniformity of impregnation of the plastisol. Use of such foam in a sandwich for subsequent heat sealing to form a laminated upholstery material proved to be ineffective, particularly with regard to weld or tensile strength. The tensile strength of such material was not acceptable. Additionally, the appearance of the heat sealing points was unacceptable.

An object of my invention is to provide a padding or bolster filler material formed from a coated expanded urethane foam.

Another object of my invention is to provide a padding or bolster filler material formed from a coated expanded urethane foam which permits such foam to be heat-sealed to fabrics for upholstery, padding and filling applications.

Another object of my invention is to form laminated upholstery materials using an expanded urethane foam as the padding or filling material where the laminated upholstery materials are formed by heat sealing techniques.

Still another object of my invention is to provide laminated upholstery materials of greater tensile strength than heretofore obtained with expanded polyvinyl foams.

Yet another object of my invention is to provide laminated upholstery materials exhibiting more permanent stiffness and rigidity.

A still further object of my invention is to provide laminated upholstery for materials which can be formed in continuous lengths.

Other objects and advantages of my invention will become readily apparent from the following description:

Briefly, in accordance with my invention, a urethane foam is first coated with a homopolymer or co-polymer resin either in powder or emulsion form. The side of the foam coated with the resin is then passed through a heating zone wherein a temperature is maintained in the zone sufficient to cause the same to flow into the interstices of the urethane foam. If the foam is to be used in an application where the same is to be contained between two fabrics supported or coated with a thermoplastic compound, both sides of the foam will be treated prior to forming the sandwich which is subsequently laminated, as for instance by high frequency welding techniques.

The sandwich is generally formed from the following materials: (1) a top element of a fabric supported or coated with a thermoplastic compound; (2) a layer of a resinated fabric; (3) the treated urethane foam; and (4) a bottom element of a fabric supported or coated with a thermoplastic compound. The sandwich is thereafter passed through the heat sealing process wherein at the sealing points, the materials are heated to a temperature at which at least a part of the thermoplastic materials readily flow and the urethane cell structure is broken down.

The resinated fabric which is placed between the treated foam and the top element includes the rayons, natural fibers, acetates, etc. and may be woven or non-woven. Such fabric is treated with a resin containing of from 15 to about 50 percent of a thermoplastic material, such as polyvinyl chloride. I have found that non-woven fabric having a weight of 3 ounces per square yard provided excellent results. The top element includes woven fabrics formed from cotton, jute, wool and the like which have been supported with thermoplastic materials, such as polyvinyl chloride, and the like. The top element may also include unsupported vinyl sheets, woven vinyl fabrics, and supported woven vinyl fabrics. The top element may be formed in a manner to simulated natural materials, such as leather and the like. The bottom element may be formed of similar material, but need not contain the same quantities of thermoplastic material per unit area as the top element.

The urethane foam is first coated with a resin containing thermoplastic compounds including homopolymers and copolymers, such as polyvinyl co-polymers and the like. It is generally contemplated that co-polymers are needed since the softening point of the resin must be lower than the softening point of the foam. It has been observed that resin having high softening points generally result in poorer heat sealing points. The resin may be either in the powder or emulsion form, whichever is desirable from the standpoint of application. One such resin is a vinyl chloride-vinyl acetate copolymer commercially available from the G. F. Goodrich Chemical Co. and sold under the name "Geon 428" or from the Union Carbide Company and sold under the name "Carbide VYHH."

The resin is spread on the foam to provide at least about 6.5 ounces of resin per square yard of foam. The foam is thereafter passed through a heating unit wherein a temperature is maintained sufficient to cause at least part of the resin to flow into the interstices of the foam. By such heat treatment, the loading surface of the foam is increased since the surface of the foam is now harder than prior to tratment. Also, if the foam is to be used in a sandwich where both surfaces thereof are to be in contact with a fabric, then both sides of the foam will be coated in accordance with my invention.

Where the final product requires a foam thickness in excess of about ⅜ inch, it is necessary to use at least two sheets of the urethane foam after the same has been coated as set forth above. It has been generally found that both sides of each sheet of foam should be coated prior to forming the sandwich which is subsequently heat sealed although in certain instances only one surface of the contacting surfaces of the foam sheets needed be coated. As hereinbefore mentioned, only one side of the foam need be treated prior to being heat sealed. The foam is only coated on one side when the thickness of the foam to be used in the sandwich is less than about ⅛ inch, or when the foam is to be heat sealed only on one side to a reinforced fabric or thermoplastic sheet for uses, such as table paddings, and the like.

The following example illustrates my invention with respect to the production of automobile seat covers. A ¼ inch urethane foam (polymerized with polyether) from a roll is coated with a "Geon 428" resin to achieve a resin distribution of 6.5 ounces per square yard of the foam. The foam is thereafter passed through a heating zone at the rate of five yards per minute. The heating zone included Calrod units of a temperature of about 900° F. disposed about 1½ inches above the foam. It was estimated that the surface temperature of the foam was about 200° F., a temperature sufficient to cause the resin to flow into the cells of the foam. The foam was then turned over and passed through the same operation so as to coat the other side of the foam.

A sandwich of materials was then prepared for subsequent heat sealing to form a laminated upholstery material. First a bottom or back-up element was placed on the lower platen of the welding machine. Such back-up element was a vinyl coated woven fabric commercially available under the name "Osnburg." Two webs of the treated foam were then placed above the lower element. A web of a resinated non-woven fabric as hereinbefore described was then placed above the foam. A web of the top element was then placed above the non-woven fabric. Such top element was a woven fabric, reinforced with a vinyl compound, and known as a 27 ounce knit. The fabric sandwich was then contacted with high frequency electrodes having a configuration of a channel pattern and operating at a frequency of 27.0 megacycles. A pressure of about 800 p.s.i.g. was exerted on the sandwich. The sandwich was maintained between the electrodes for about 4.5 seconds. As is well known in the art of heat sealing fabrics, both electrodes were suitably cooled with a continuously circulating coolant. There was a delay of a few seconds prior to withdrawing the electrodes to permit setting of the thermoplastic materials, the concept known in the art as "dwell after weld."

The now laminated upholstery material withdrawn from the heat sealing machine exhibited high tensile strength in the weld and good flexibility in hand as compared to laminated upholstery materials formed of polyvinyl chloride foams, untreated urethane foams or plastisol-treated urethane foams. Additionally, there was better resiliency of the product of my invention as compared to materials formed with polyvinyl chloride foams. Since the urethane foams are more resilient than polyvinyl chloride foams, better configurations of the material were also exhibited by the product of my invention. By better configurations is meant that there is greater cross-sectional area of the foam between adjacent sealing points resulting from greater resiliency of urethane foams. The surface of the heat sealing points was uniform, comparable to the physical appearances of laminated upholstery materials formed with polyvinyl chloride foams.

As is readily apparent from the foregoing description, laminated upholstery materials can be formed in accordance with my invention which have greater uniformity, which can be more readily mass produced and which is more economical. As a fundamental proposition, urethane foams are less costly than polyvinyl chloride foams. Further, urethane foams have more uniform cell structure and can be prepared in almost infinite lengths as compared to polyvinyl foams which can only be formed in relatively short lengths since such foams are formed under pressure.

As set forth above, a resinated fabric is disposed between the top material and the foam layer. The function of such layer of fabric is not completely understood, but has been found necessary so as to form an acceptable weld for upholstery materials to be used as vehicle seats and back structures. It is believed that such fabric acts as a heat barrier so as to permit the urethane foam to reach a temperature at which the same will break down. As is well known the softening temperature of urethane foams is generally higher than polyvinyl foams. In some applications, however, it is not necessary to use such a resinated fabric.

While I have described one aspect of my invention with respect to heat sealing a sandwich including a urethane foam and a reinforced vinyl top element, it is believed that the concept of my invention is applicable to the formation of laminated upholstery materials where the expanded polymer has a softening point higher than the softening point of the thermoplastic material of the top element. As hereinbefore set forth, the top element may be a sheet formed of a thermoplastic compound, or may be a supported or coated thermoplastic fabric. It is believed that an expanded polymer having a softening point higher than the thermoplastic compound of the top element, may be heat sealed to such a top element, particularly by high frequency techniques by use of an intermediate layer of a resinated fabric (woven or non-woven) which is disposed between the foam and top element prior to heat sealing.

While I have described a preferred form of my invention, I am aware that variations may be made thereto, and I therefore, desire a broad interpretation of my invention within the scope of this disclosure and the following claims.

I claim:
1. A process for producing a laminate comprising:
   (a) applying an unplasticized thermoplastic resin to a surface of a non-thermoplastic expanded polymer, said thermoplastic resin having a softening point below the softening point of the expanded polymer;
   (b) heating the expanded polymer from step (a) to a temperature to cause the resin to flow into the interstices of the expanded polymer;
   (c) forming a sandwich comprised of a top element containing a thermoplastic compound and the expanded polymer of step (b); and
   (d) heat sealing the sandwich to bind the components and form a laminate.

2. The process as defined in claim 1 wherein the resin is a vinyl chloride polymer in powder form, the expanded polymer is a polyurethane foam.

3. The process as defined in claim 2 wherein the heat sealing of step (d) is high pressure, high frequency welding between high frequency electrodes.

4. The process as defined in claim 3 wherein the sandwich formed in step (c) includes a resinated non-woven fabric between the top element and the expanded polymer.

5. A process for producing a laminate comprising:
   (a) applying an unplasticized thermoplastic resin to the surface of a non-thermoplastic expanded polymer, said thermoplastic resin having a softening point below the softening point of the expanded polymer;
   (b) heating the expanded polymer from step (a) to a temperature to cause the resin to flow into the interstices of the expanded polymer;
   (c) forming a sandwich comprised of a top element comprising a fabric reinforced with a thermoplastic compound, the expanded polymer of step (b) and a bottom element comprising a fabric reinforced with a thermoplastic compound; and
   (d) heat sealing the sandwich to bind the components and form a laminate.

6. The process as defined in claim 5 wherein the resin is a vinyl chloride polymer and the expanded polymer is a polyurethane foam.

7. The process as defined in claim 6 wherein the resin is in powder form and the heat sealing of step (d) is high pressure, high frequency welding between high frequency electrodes.

8. A process for producing a laminate comprising:
   (a) applying an unplasticized thermoplastic resin in powder form to the surface of a non-thermoplastic expanded polymer, said thermoplastic resin having a softening point below the softening point of the expanded polymer, said resin being a vinyl chloride polymer and said expanded polymer being a polyurethane foam;
   (b) heating the expanded polymer from step (a) to a temperature to cause the resin to flow into the interstices of the expanded polymer;
   (c) forming a sandwich comprised of a top element comprising a fabric reinforced with a thermoplastic compound, a resinated non-woven fabric, the expanded polymer of step (b) and a bottom element comprising a fabric reinforced with a thermoplastic compound; and
   (d) heat sealing the sandwich to bind the components and form a laminate by high pressure, high frequency welding between high frequency electrodes.

9. The process as defined in claim 8 wherein steps (a) and (b) are effected on both sides of the foam prior to step (c).

10. The product produced by the process of claim 1.
11. The product produced by the process of claim 4.
12. The product produced by the process of claim 6.
13. The product produced by the process of claim 8.

References Cited

UNITED STATES PATENTS

| | | |
|---|---|---|
| 2,639,532 | 5/1953 | Simon et al. |
| 2,946,713 | 7/1960 | Dusina et al. |
| 3,170,178 | 2/1965 | Scholl. |
| 3,170,832 | 2/1965 | Wilson et al. _____ 161—160 |
| 3,244,571 | 4/1966 | Weisman. |
| 3,256,131 | 6/1966 | Koch et al. _____ 161—161 |
| 3,306,967 | 2/1967 | Turkewitsch. |
| 2,077,125 | 4/1937 | Miller et al. _____ 36—77 |
| 3,061,460 | 10/1962 | Schickedanz _____ 117—98 |

FOREIGN PATENTS

| | | |
|---|---|---|
| 591,726 | 2/1960 | Canada. |
| 1,329,849 | 5/1963 | France. |
| 955,285 | 4/1964 | Great Britain. |

ROBERT F. BURNETT, *Primary Examiner.*

ALEXANDER WYMAN, MORRIS SUSSMAN,
*Examiners.*

G. D. MORRIS, R. H. CRISS, *Assistant Examiners.*